July 2, 1968     S. HOCHBERG     3,391,020
COATED SIDING PANEL
Filed Sept. 1, 1964
FIG. Ia
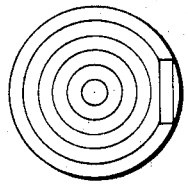
FIG. Ib
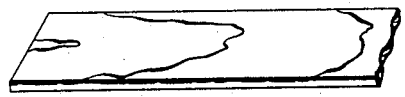
FIG. II a
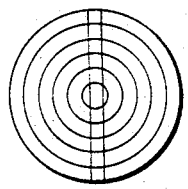
FIG. II b
FIG. III a
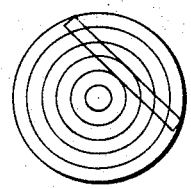
FIG. III b
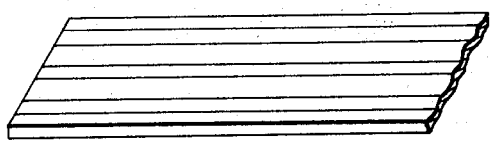
FIG. IV a
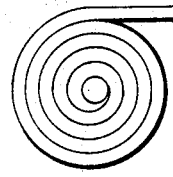
FIG. IV b
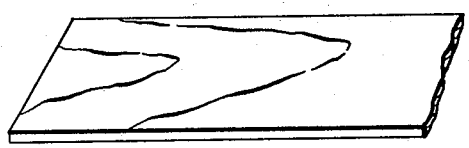
FIG. V
INVENTOR
SEYMORE HOCHBERG
BY Raymond E. Blomstedt
ATTORNEY

United States Patent Office 3,391,020
Patented July 2, 1968

3,391,020
COATED SIDING PANEL
Seymore Hochberg, Wynnewood, Pa., assignor to E. I. du Pont de Nemours and Company, Wilmington, Del., a corporation of Delaware
Filed Sept. 1, 1964, Ser. No. 393,560
10 Claims. (Cl. 117—148)

ABSTRACT OF THE DISCLOSURE

An architectural article of a coniferous wood substrate that has at least one major planar face in adherent contact with an organic coating composition, the plane of the face being at an angle of at least 1° to the longitudinal axes of at least 80% of the tracheids at the surface of the face.

---

This invention concerns finished wood surfaces having exceptional resistance to weathering.

It is well known that wood structures exposed to weathering deteriorate rapidly unless protected in some way. Conventionally such structures are treated with a coating composition such as a paint, lacquer, varnish or the like for this purpose but despite advances in coating composition technology such expedients are of limited duration. Improvements in the life and durability of such coatings on wood substrates are an obvious need.

The poor durability of clear finishes (i.e., unpigmented protective coating compositions—lacquers, varnishes, latexes, etc.), particularly over redwood, is notorius and is a major reason for the relatively small amount of clear finishes used by the building industry compared to pigmented finishes. On pine and other soft woods the durability of clear finishes is somewhat better but still is inferior to coatings containing hiding pigments. Techniques for improving adhesion of clear finishes to substrates of coniferous woods and minimizing the influence of water have been a long felt need.

The cause of failure of finishes on wood substrates is debatable. The problem is discussed at some length in Organic Coating Technology by Payne, vol. II, pages 1070–1079 (John Wiley & Sons, 1961), who suggests various reasons for failures of finishes on wood substrates but concludes (page 1075) that "more data are required before a completely satisfactory explanation of the cause of the observed failure will be available." Payne's only suggestion (pages 1075–76) for minimizing such failures is to use a good grade lumber—one free from knots, pitch or resin pockets or streaks and loose grain, but he recognizes this expensive expedient is not really a solution to the problem and he does not suggest how failures of finishes over wood surfaces free from such defects can be avoided.

In accordance with this invention a coniferous wood substrate finished (coated) with a conventional coating composition is prepared having a greatly extended useful life, compared to prior art finished wood substrates of the same wood coated by conventional methods with the same composition. This invention is independent of the character of coating compositions and provides extended durability and resistance to finish deterioration regardless of the particular coating composition employed. However, clear finishes such as unpigmented lacquers and varnishes are particularly preferred coating compoistions for use herein.

This invention is directed to coated wood architectural articles comprising essentially a coniferous wood substrate having at least one major planar face in adherent contact with an organic coating composition, the plane of said face being at an angle of at least 1° to the longitudinal axes of at least 80% of the tracheids at the surface of said face.

The term "coniferous wood" refers to lumber obtained by cutting coniferous trees. These are conventionally also called "soft woods" and are usually characterized by a close grain. These can be divided into four general groups in order of decreasing durability of paint over these woods. These groups are as follows: (1) cedars, cypress, redwood, (2) northern white pine, sugar pine, western white pine, (3) white fir, hemlocks, lodgepole pine, ponderosa pine, spruces, and (4) Douglas fir, Norway pine, southern yellow pine, tamarack and western larch. Group (1) contains those species providing longest finish life and those in group (4) provide shortest life to finishes coated thereon. Woods from trees of groups (2) and (3) generally exhibit a finish durability intermediate between the group (1) and (4) woods.

Architectural coated wood articles are those used in building homes, offices, factories and similar structures which are normally subjected to exterior weathering and which present the greatest problems with respect to durability and appearance of their painted surfaces. These articles include lumber, plywood, siding, shutters, windows, screens, trim, benches, awnings, porches and the like. Because these articles are normally exposed to the elements they are usually coated with protective organic coatings for purposes of preservation and also appearance. In accordance with this invention the useful life of the coatings on such articles is extended several fold by cutting in a prescribed manner the wood used making such articles.

In accordance with this invention lumber from a conifer and designated for ultimate treatment with an organic coating composition (e.g., painting) for protection against atmospheric deterioration is cut so that at least 80% of the tracheids sheared by the cutting (i.e., meeting the face produced by the cutting) are sheared at an angle of at least 1° to their respective longitudinal axes. Normally this will mean, due to natural irregularities in the linear structure of a tree, that the log is cut at an angle of at least 2° to the main longitudinal axis of the log, and cutting at a 5° angle will usually shear at least 90% of the tracheids, thus cut, at an angle of at least 1° to their respective longitudinal axis. It will usually be sufficient, except with a highly irregular log, to simply cut along a plane which is at an angle of at least 2° to the line joining the centers of the ends of the log. With an irregular log one need merely estimate the position of the log axis and cut at a sufficiently large angle to insure that the requirements set forth above, with respect to cutting individual tracheids, are met.

This invention is concerned with wood substrates which have a major planar face which is to be painted with a coating composition. The term "painted" is used in its most general sense to include coated with protective finishes such as pigmented or unpigmented varnishes, lacquers, latexes, enamels and other materials such as waxes and oils. Most lumber is cut in the form of boards having the configuration of a right parallelepiped; and exhibiting three pairs of surfaces referred to as the flat faces, the edges and the ends, respectively. The two flat faces are the "major planar faces" referred to herein and together usually contain about 75–95% of the total exterior surface area of conventional "one-inch" lumber so that each major face contains about 37–48% of the total exterior area of the lumber on this basis. One of these faces is normally exposed to weathering in a architectural structure and is therefore painted for protection and to improve its appearance. This invention is concerned with lumber in which at least one flat face is formed by shearing at least 80% of the tracheids meeting the surface thus formed at an angle of at least 1° to their respective longitudinal axes. In some instances this face of the lumber will ultimately be carved, beveled or grooved, as in the production of trim for windows and doors, but such after-cutting does not detract from the advantages provided by cutting the lumber initially according to this invention. The term "major face" refers to a surface which contains at least 20% of the total exterior surface area of a board or other piece of lumber used or to be used as a wood substrate for coating with a protective coating composition. Normally a surface which is cut in a manner to benefit from this invention will contain more than about 40% of the total exterior surface area of the wood.

The invention will be more easily understood by referring to the drawing:

FIGURES I, II, III and IV show how logs are cut to provide conventional grain patterns in the resulting lumber, shown by FIGURES I*b*, II*b*, III*b* and IV*b*, respectively. FIGURE I*a* illustrates a "flat cut," which is a cut parallel to the annual ring of the tree and produces the flat grained lumber of FIGURE I*b*.

FIGURE II*a* shows a "radial cut" which is perpendicular to the annual ring and produces the edge grained lumber shown in FIGURE II*b*.

FIGURE III*a* shows a "diagonal cut" which is neither perpendicular nor tangential to the annual ring and produces the grain pattern of FIGURE III*b* which is a combination of flat and edge grains.

FIGURE IV*a* shows a rotary cut, usually used in cutting plies for plywood manufacture, which produces the flat grained structure of FIGURE IV*b*.

All of FIGURES I, II, III and IV show conventional methods for cutting logs and producing lumber which when coated with a protective coating composition exhibits poor durability to weathering relative to the articles of this invention.

FIGURE V illustrates the manner of cutting lumber in accordance with this invention, the surface A possessing one or another of the "flat grain," "edge grain" or combination grains illustrated in FIGURES I*b*, II*b*, III*b* or IV*b* and beveled surface B cut at an angle of about 5° to surface A. Thus surface B is cut at an angle of about 5° to the axis of the tree from which the board 1 was cut, thereby shearing transversely practically all of the tracheids touching the face of the cut. Surface B represents a surface cut in accordance with a preferred embodiment of this invention, and when painted or otherwise coated with a coating composition, provides an unusually durable finished wood surface.

Why such a coated surface should possess such exceptional resistance to deterioration is not known with certainty but it is known that any coating composition suitable as a protective finish for wood, exhibits much greater resistance to atmospheric deterioration if utilized in accordance with this invention. This invention is applicable to paints generally which term as commonly used includes conventional house paints, varnishes, lacquers, enamels, latexes and the like but is particularly directed to clear finishes since these have a notoriously short useful life. Coating compositions useful in this invention can contain any or all the conventional additives used in preparing coating compositions for wood substrates. Conventional modes of applying these compositions to the wood substrates used in this invention are also suitable here and any of the woods customarily used in manufacturing articles (including houses and other buildings) can be used. By the practice of this invention the durability of protective coatings, applied as liquids to wood substrates, is very significantly enhanced and the durability of clear finishes in particular, is improved to such as extent that considerably greater use of clear finishes is practical.

The following examples illustrate the invention.

Example 1

The following ingredients are mixed together in the proportions indicated to form a coating composition:

|  | Pounds |
|---|---|
| 1,3-cyclic acetal addition polymer [1] | 691.4 |
| A solution of cobalt butyl phthalate (33⅓% solids in xylol and containing 3.1% active cobalt based on solution weight) | 8.0 |
| A solution of phenyl mercuric oleate (10% solids solution in mineral spirits) | 16.6 |
| Xylol | 119.0 |
|  | 835.0 |

[1] Prepared by transesterifying a polymer of 37 pounds methyl methacrylate and 15 pounds ethyl acrylate with 48 pounds of hydroxy butyl-2-vinyl-1,3-dioxolane.

The above coating composition is brushed on one face of several wood panels, similar to FIGURE V, in the amount of 500 square feet per gallon using three coats and dried. The wood panels are edge grained redwood which are initially sanded with #320 sand paper and scuffed between coats. The edges and back of the panels are pained with aluminum wood primer. The wood panels measure 5½" x 12" x ½" in size. Prior to exposure to weathering characteristics, the coated flat grain portions and the beveled portion of the coated face of the panels are each scored in three places with a cross-hatch, these being 1 mil, 3 mils and 6 mils deep a cross-hatch, these cross-hatch serves to accelerate loss of adhesion of the coating under outdoor weathering conditions. All panels are exposed to outside weathering conditions in Florida.

After 3 months' weathering the A surfaces of the panels are badly deteriorated over 50% of the surface area but with the B surfaces deterioration is localized within about ¼ in each cross-hatch line, the remaining areas being in good condition.

Example 2

A clear coating composition was prepared by mixing the following ingredients in the manner indicated.

| First portion: | Pounds |
|---|---|
| Colloidal silica pigment having a particle size of 0.015–0.02 micron | 50.04 |
| A solution of a clear, light yellow liquid sodium polyacrylate (25% solids in water) | 0.84 |
| A long chain cellulose polymer "Methocel HG," viscosity: 4000 cps. | 0.12 |
| An anionic surface active blend of sulfated saturated fats of high melting point and containing 8% free fatty acid (60% solids in water) | 0.39 |
| Ethylene glycol | 2.25 |
| An aqueous solution of polyacrylate as above | 0.46 |
| A solution of phenyl mercury oleate (10% solids solution in mineral spirits) | 2.06 |
| Ammonia solution containing a minimum of 24% ammonia | 0.34 |
| Water | 355.40 |

(These ingredients are put into a pebble mill and ground 48 hours to a fineness of 0–0.5 mil.)

| Second portion: A white milky liquid acrylic polymer emulsion (46% solids in water) [1] | 471.1 |
|---|---|
| Total | 883.0 |

[1] A polymer of methyl methacrylate, ethyl acrylate and methacrylic acid in the ratio of 33/66/1 post iminated by reaction with propylene imine.

The first and second portions are mixed in a container until uniform and then packaged.

The coating composition thus prepared is evaluated on test panels in the same manner as in Example 1 with similar results.

Example 3

A clear coating composition was prepared by mixing the following ingredients in the manner indicated.

| | Pounds |
|---|---|
| A 23 gallon China wood oil-butyl phenol formaldehyde varnish (60% solids in mineral spirits) | 475.6 |
| A solution of lead naphthenate (63% solids solution in mineral spirits having 24% active lead) | 35.9 |
| A solution of cobalt naphthenate (54% solids in mineral spirits, 6% active cobalt) | 1.2 |
| A solution of calcium naphthenate (60% solids solution in mineral spirits having 4% active calcium) | 25.5 |
| A solution of cresol (an 11% solids solution in mineral spirits of a mixture of guaiacol and 4-methyl-guaiacol) | 17.8 |
| Dipentene | 23.3 |
| Santoscreen 99 (a nascent ultraviolet light absorber (100% solids)) | 42.8 |
| Toluene | 141.8 |
| Total | 762.0 |

The coating composition thus prepared is evaluated on wood panels as described in Example 1 with similar results, namely, that the coating on the conventionally cut surface A deteriorated very much more rapidly than the coating on the beveled surface B prepared in accordance with this invention.

Example 4

A clear coating composition was prepared by mixing the following ingredients in the manner indicated.

| | Pounds |
|---|---|
| First portion: | |
| A solution of 63% linseed oil-glycerol phthalate alkyd (an 83% solids solution in a hydrocarbon solvent having an acid number of 3–5, Gardner-Holdt viscosity of Y–$Z_1$) | 70.2 |
| A solution of soya lecithin (a 50% solids solution dissolved in mineral spirits of an ethereal compound of choline and glycerol phosphoric acid, combined as a glyceride with stearic and palmitic acid) | 8.0 |
| A hydrocarbon solvent mixture (having a boiling range 175–223° C. and an aniline point (ASTM D1012–51) 33–37° C.) | 355.1 |
| Second portion: | |
| Colloidal silica pigment having a particle size of 0.015–0.02 micron | 87.9 |
| Dimethyl dioctadecyl ammonium bentonite | 0.8 |
| Third portion: | |
| A solution of 63% linseed oil-glycerol phthalate alkyd (same as in first portion) | 200.0 |
| A solution of lead naphthenate (63% solids solution in mineral spirits having 24% active lead) | 31.2 |
| A solution of cobalt naphthenate (54% solids solution in mineral spirits having 6% active cobalt) | 1.1 |
| A solution of calcium naphthenate (60% solids solution in mineral spirits having 4% active calcium) | 20.6 |
| A solution of phenyl mercury oleate (10% solids solution in mineral spirits) | 5.6 |
| Third portion: | |
| A solution of cresol (an 11% solids solution in mineral spirits of a mixture of guaiacol and 4-methyl-guaiacol) | 3.5 |
| A solution of 2,4-hydroxybenzophenone solution (30% solids solution in cyclohexanol) | 38.0 |
| Total | 822.0 |

The materials of the first portion are mixed together for about 10 minutes. The materials of the second portion are slowly added to the mixture of the first portion and mixed for 40 minutes. The mixture of the first portion and second portion is slowly drained into a sand-grinding unit which reduces the fineness of the dispersion under 0.1 mil. The materials of the third portion are added and the mixtures thoroughly blended. The coating composition thus prepared is evaluated on wood panels as described in Example 1 with similar results, namely, that the coating on the conventionally cut surface A deteriorated very much more rapidly than the coating on the beveled surface B prepared in accordance with this invention.

Example 5

A clear coating composition is prepared by dissolving 338.8 pounds of an interpolymer in 508.2 pounds of methyl amyl ketone. The interpolymer is obtained by polymerizing vinylidene fluoride, trifluoroethylene, vinyl butyrate and bis-chloroethylvinyl phosphonate in the weight proportions 80/20/5/0.5 following the procedure of Example 5 of U.S. patent application Ser. No. 286,470, filed June 10, 1963.

The resulting clear coating composition is evaluated in the same manner as in Example 1 with similar results, namely, that the beveled surface B remained in good condition long after the coating on edged grained surface A had become mostly destroyed.

I claim:

1. A siding panel comprising essentially a coniferous wood substrate having at least one major planar face in adherent contact with an organic coating composition, the plane of said face being at an angle of 1°–5° to the longitudinal axes of at least 80% of the tracheids at the surface of said face.

2. The article of claim 1 in which the wood substrate is pine.

3. The article of claim 1 in which the wood substrate is cypress.

4. The article of claim 1 in which the wood substrate is cedar.

5. The article of claim 1 in which the wood substrate is redwood.

6. The article of claim 1 in which the coating composition is unpigmented.

7. The article of claim 1 in which the coating composition is pigmented.

8. The article of claim 1 in which the coating composition contains as a vehicle an interpolymer of methyl methacrylate and ethyl acrylate transesterified with a 4-hydroxy alkyl-2-vinyl-1,3-cyclic acetal.

9. The article of claim 1 in which the coating composition contains as a vehicle an interpolymer of methyl methacrylate, ethyl acrylate and methacrylic acid in the ratio of about 33/66/1.

10. The article of claim 1 in which the coating composition contains an alkyd resin as a vehicle.

No references cited.

MURRAY KATZ, *Primary Examiner.*